United States Patent
Spata (10) Patent No.: US 9,152,872 B2
(45) Date of Patent: Oct. 6, 2015

(54) USER EXPERIENCE ANALYSIS SYSTEM TO ANALYZE EVENTS IN A COMPUTER DESKTOP

(71) Applicant: Accenture Global Services Limited, Dublin (IE)

(72) Inventor: Gregory P. Spata, West Chester, OH (US)

(73) Assignee: ACCENTURE GLOBAL SERVICES LIMITED, Dublin (IE)

(*) Notice: Subject to any disclaimer, the term of this patent is extended or adjusted under 35 U.S.C. 154(b) by 199 days.

(21) Appl. No.: 13/674,788

(22) Filed: Nov. 12, 2012

(65) Prior Publication Data

US 2014/0133692 A1 May 15, 2014

(51) Int. Cl.
*G06K 9/00* (2006.01)
*G06K 9/20* (2006.01)
*G06F 11/34* (2006.01)

(52) U.S. Cl.
CPC .............. *G06K 9/20* (2013.01); *G06F 11/3419* (2013.01); *G06F 11/3476* (2013.01); *G06F 11/3414* (2013.01); *G06F 11/3438* (2013.01); *G06F 2201/86* (2013.01)

(58) Field of Classification Search
None
See application file for complete search history.

(56) References Cited

U.S. PATENT DOCUMENTS

| | | | | |
|---|---|---|---|---|
| 5,220,658 A * | 6/1993 | Kerr et al. | ......... | 703/22 |
| 5,708,767 A * | 1/1998 | Yeo et al. | ......... | 345/440 |
| 5,768,681 A * | 6/1998 | Dan et al. | ......... | 725/95 |
| 6,438,275 B1 * | 8/2002 | Martins et al. | ......... | 382/300 |
| 6,539,055 B1 * | 3/2003 | Hazra | ......... | 375/240.16 |
| 6,583,897 B1 * | 6/2003 | Harrington | ......... | 358/532 |
| 7,890,867 B1 | 2/2011 | Margulis | | |
| 8,107,714 B2 * | 1/2012 | Moya et al. | ......... | 382/141 |
| 8,175,390 B2 * | 5/2012 | Maxwell et al. | ......... | 382/190 |
| 8,228,979 B2 | 7/2012 | Washino | | |
| 8,339,414 B2 * | 12/2012 | Langtind et al. | ......... | 345/612 |
| 8,539,447 B2 * | 9/2013 | Kilian et al. | ......... | 717/124 |
| RE44,684 E * | 12/2013 | Anderson et al. | ......... | 705/26.64 |
| 8,675,130 B2 * | 3/2014 | Fincham | ......... | 348/552 |
| 8,730,152 B2 * | 5/2014 | Hare et al. | ......... | 345/107 |
| 9,019,292 B2 * | 4/2015 | Bloomfield et al. | ......... | 345/552 |
| 2003/0169269 A1 * | 9/2003 | Sasaki et al. | ......... | 345/581 |
| 2005/0053904 A1 * | 3/2005 | Shephard et al. | ......... | 434/236 |
| 2005/0197804 A1 * | 9/2005 | Reeves | ......... | 702/187 |

(Continued)

FOREIGN PATENT DOCUMENTS

GB      2387710      10/2003

OTHER PUBLICATIONS http://www.microsoft.com/windows/windowsmedia/howto/articles/screencap.aspx, downloaded Nov. 12, 2012.

(Continued)

*Primary Examiner* — Chan Park
*Assistant Examiner* — Iman K Kholdebarin
(74) *Attorney, Agent, or Firm* — Mannava & Kang, P.C.

(57) ABSTRACT

A user experience analysis system to measure a user experience associated with a computer desktop may include an event capture subsystem and a duration analysis subsystem. The event capture subsystem may capture videos of the desktop before and after an infrastructure change. The duration analysis subsystem may analyze the videos to determine and compare durations of events occurring in the desktop that are captured in the videos, and determine changes in user experience based on the analysis.

16 Claims, 9 Drawing Sheets

(56) References Cited

U.S. PATENT DOCUMENTS

| | | | |
|---|---|---|---|
| 2005/0201733 A1* | 9/2005 | Chiu et al. | 386/96 |
| 2005/0254775 A1* | 11/2005 | Hamilton et al. | 386/46 |
| 2005/0262540 A1* | 11/2005 | Swix et al. | 725/90 |
| 2006/0031854 A1 | 2/2006 | Godwin | |
| 2006/0038808 A1* | 2/2006 | Willis | 345/208 |
| 2006/0222081 A1* | 10/2006 | Carrigan | 375/240.24 |
| 2006/0230414 A1* | 10/2006 | Zhang | 725/17 |
| 2006/0244827 A1* | 11/2006 | Moya et al. | 348/143 |
| 2007/0031119 A1* | 2/2007 | Iwanaga | 386/95 |
| 2008/0129875 A1* | 6/2008 | Lei et al. | 348/700 |
| 2008/0282160 A1 | 11/2008 | Tonnison et al. | |
| 2009/0034937 A1* | 2/2009 | Kusunoki et al. | 386/96 |
| 2009/0037914 A1* | 2/2009 | Chagoly et al. | 718/101 |
| 2009/0109290 A1* | 4/2009 | Ye et al. | 348/155 |
| 2009/0113303 A1* | 4/2009 | Goossen et al. | 715/719 |
| 2009/0132436 A1* | 5/2009 | Pershing et al. | 705/400 |
| 2009/0160856 A1* | 6/2009 | Hoguet | 345/420 |
| 2009/0328237 A1* | 12/2009 | Rodriguez et al. | 726/32 |
| 2010/0182401 A1* | 7/2010 | Yoon et al. | 348/42 |
| 2010/0207960 A1* | 8/2010 | Kimpe et al. | 345/618 |
| 2012/0148216 A1* | 6/2012 | Pavagada et al. | 386/278 |
| 2014/0022387 A1* | 1/2014 | Vallone et al. | 348/143 |
| 2014/0125834 A1* | 5/2014 | Oya et al. | 348/222.1 |

OTHER PUBLICATIONS http://www.mandsoft.com/, Screen Movie Studio 2.6, donwloaded Nov. 12, 2012.

http://www.corel.com/content/pdf/vsx5/vsx5_user_guide_en.pdf, VideoStudio Pro X5 User Guide, downloaded Nov. 12, 2012.

http://www.any-video-converter.com/support/faqs/video-editing.php, Video Editing, downloaded Nov. 12, 2012.

http://www.xilisoft.com/video-editing-software.html, Xilisoft Video Editor 2, downloaded Nov. 12, 2012.

http://software.intel.com/en-us/articles/intel-performance-counter-monitor/, downloaded Nov. 12, 2012.

http://msdn.microsoft.com/en-us/library/z9z62c29.aspx Analyzing Application Performance by Using Profiling Tools, Visual Studio 2012.

http://publib.boulder.ibm.com/infocenter/rpthelp/v7r0m0/index.jsp?topic=/com.ibm.rational.test.lt.sap.doc/topics/tsapchtestgen.html, Changing SAP test generation preferences, downloaded Nov. 12, 2012.

http://documentation.apple.com/en/finalcutpro/usermanual/index.html, downloaded Nov. 12, 2012.

\* cited by examiner

USER EXPERIENCE ANALYSIS SYSTEM TO ANALYZE EVENTS IN A COMPUTER DESKTOP

BACKGROUND

Computer infrastructure components providing applications for end users may vary widely. Many different variables related to different infrastructure components may impact application performance. For example, in a distributed computing environment, applications may be executed on one or more servers in geographic locations that are remote from the end user. Variables, such as server workload, network bandwidth, workstation processor utilization, etc., may impact application performance. In another environment, a user may execute an application locally on their personal computer but use data stored on a server accessed via a local area network, or the data for the application may be stored locally. In this environment, variables, such as processor and memory utilization, bandwidth in a local area network, or other variables may impact application performance. In yet another environment, where an application and all data for the application are stored locally, an upgrade in software, memory, etc., may impact application performance.

It is sometimes necessary to change computer infrastructure components in any of the environments described above. For example, a hard drive or motherboard may fail in a server or personal computer, which requires these components to be changed. In another example, a router may fail which may cause an end user to use a different router to access a network. In another example, a new version of an operating system may be available and thus a software upgrade may be needed. In another example, applications may be moved from one backend server to another backend server. A change in computer infrastructure may cause a change in application performance. A reduction in application performance can negatively impact the end user experience. After completing a computer infrastructure change, administrators may measure resource utilizations, such as central processing unit (CPU) utilization, memory utilization, bandwidth, etc., to test the impact of the computer infrastructure change. However, in many cases, even if CPU utilization, memory utilization, or bandwidth is sufficient, applications may run slower than prior to the change.

SUMMARY

According to an embodiment, a user experience analysis system to analyze events in a computer desktop may include a data storage, an event capture subsystem, which may be executed by a processor, and a duration analysis subsystem. The event capture subsystem may capture a first video of a desktop of a target computer prior to an infrastructure change and capture a second video of the desktop after the infrastructure change and store the first video and the second video in the data storage. The duration analysis subsystem may determine a first duration of an execution of an event in the desktop from the first video and determine a second duration of an execution of the event in the desktop from the second video, and compare the first duration and the second duration to measure a change in user experience.

According to an embodiment, a method of measuring user experience associated with a computer desktop may include storing a first video of a desktop in a storage device; storing a second video of the desktop in the storage device; determining a first duration of an event occurring in the desktop from the first video; determining a second duration of the event occurring in the desktop from the second video; and comparing the first duration and the second duration to measure a change in the user experience.

According to an embodiment, a non-transitory computer readable medium may store machine readable instructions that are executable by a processor to bad a first video of a desktop into a computer system, wherein the first video includes a plurality of events occurring in the desktop prior to an infrastructure change that is operable to impact execution of the plurality of events; determine durations of the plurality of events in the first desktop from the first video; load a second video of the desktop into the computer system, wherein the second video includes the plurality of events occurring in the desktop after the infrastructure change; determine a first set of durations of the plurality of events from the first video; determine a second set of durations of the plurality of events from the second video; and compare the first and second sets of durations to measure a change in the user experience.

BRIEF DESCRIPTION OF DRAWINGS

Features of the present disclosure are illustrated by way of embodiments and examples shown in the following figures. In the following figures, like numerals indicate like elements.

FIGS. 4-8A-B illustrate examples of screenshots for the user experience analysis system.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

According to an embodiment, a user experience analysis system captures events happening on a user's desktop, and may measure duration of the captured events to detect a change in a user experience. The user experience may include a user's perception of execution of an event, which may be based on length of time to execute the event. The desktop, also referred to herein as computer desktop, comprises a graphical user interface that may be the primary user interface of a computer. The desktop is where applications are displayed when executed. The desktop may include a background (or wallpaper), icons for applications or other programs, folders and toolbars and taskbars.

The events may be captured before and after an infrastructure change. An infrastructure change is any change in hardware or software that may impact execution of an event occurring on a desktop. Some examples of infrastructure changes may include software upgrades to applications or operating systems, changes in a processor or memory, moving an application from one server to another server, and so on.

An event happening in a desktop may include a user input and a response. A user input may include a selection of an item on the desktop and a response may include anything displayed on the desktop in response to the selection. The user input may include a mouse click or a mouse double click on an item on a desktop or selection of an item via a keyboard or via another input device. For example, a user input may include a double click on an icon to launch an application, and the response is the display of a first screen of the application. For example, when a spreadsheet application is launched, the first screen may be a blank spreadsheet. For a word processing application, the first screen may be a display of a blank document. A user input may include a click on a start icon or on a button and the response is the displaying of a menu. A user input may include a right mouse click to display a menu. A user input may include selection of a speaker symbol displayed on the desktop to display a volume adjustment interface. Selection of an item on the desktop may be performed by a keyboard or other types of input devices, and these selections may also be captured. Generally, a user input may include selection of any item displayed on a desktop to invoke a response, such as displaying a menu, displaying an application screen, etc.

Duration of an event may include a length of time from the selection of an item to the completion of a response to the selection of an item. For example, the duration of an event is the length of time from clicking on a start button to the completion of displaying a menu generated in response to clicking on a start button. In another example, the duration is the length of time from double clicking on an application icon until the first screen of the application is fully displayed on the desktop. In many instances, the duration of an event can be directly correlated to a user's productivity, and the faster the event is executed, the more productive a user can be. The user experience analysis system 100 may measure and analyze durations of events, and the measurements and analysis may be used to determine an impact on user productivity and to implement changes to improve user productivity.

Figure 1:
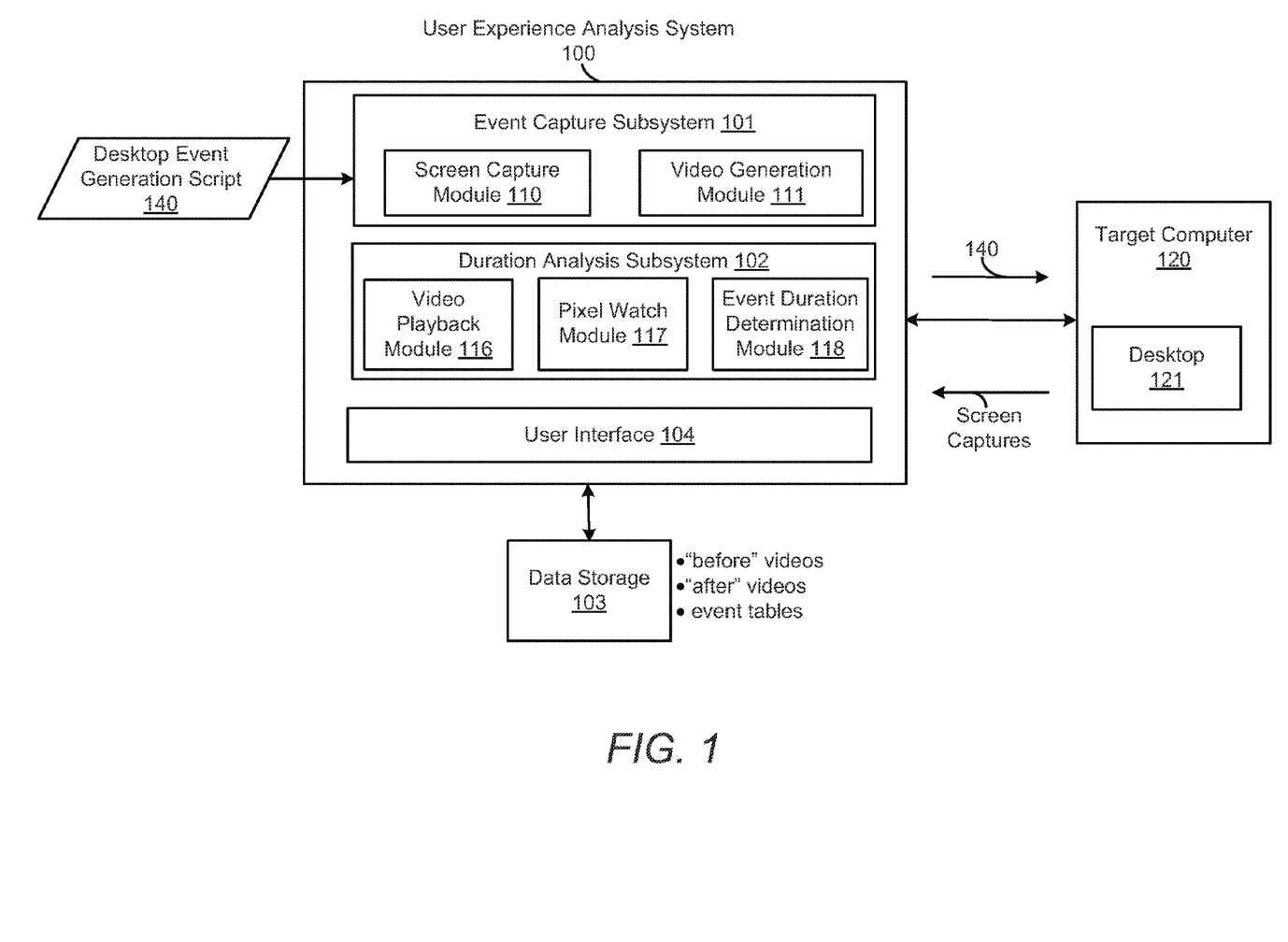
FIG. 1 illustrates a user experience analysis system, according to an embodiment.

FIG. 1 illustrates a user experience analysis system 100, according to an embodiment. The user experience analysis system 100 may include an event capture subsystem 101 and a duration analysis subsystem 102. Data storage 103 stores information for user experience analysis system 100. The data storage 103 may comprise a hardware storage device. A graphical user interface 104 may be generated for a user to enter user inputs for the system 100 and to display information for the system 100.

The event capture subsystem 101 captures events performed on a desktop 121 of a target computer system 120. In one embodiment, the event capture subsystem 101 includes a screen capture module 110 to capture and store images of the desktop 121 overtime. A video generation module 111 generates video of the images captured by the screen capture module 110. For example, the screen capture module 110 may use an application program interface (API) of an operating system of the target computer system 120 to capture the images of the desktop 121. The API may be invoked to execute a screenshot function to capture a screenshot of desktop 121. A number of screenshots may be captured every second. By way of example, if the target computer system 120 is running a WINDOWS operating system, the API may comprise a WINDOWS graphic device interface API, which is a low-level operating system API, or a WINDOWS media API, which is part of a high-level set of APIs that allow interaction with a graphics processing system of WINDOWS. In yet another example, MICROSOFT DIRECTX comprises a set of APIs that may be used for the screen captures. Rather than using an API, other approaches may be used to capture screenshots and/or video of the desktop 121.

The video generation module 111, for example, generates video from the screenshots. For example, the screenshots are converted to video frames and stored in the data storage 103 as video of the desktop captured over a period of time. In an example, off-the-shelf software may be used to convert images to frames in a video format, such as converting a .JPG or other type of image format to a video format, such as .AVI, .MP4, MPEG or another video format. The video includes events occurring on the desktop 121 during the time the images of the desktop 121 are captured. Capturing video of the desktop 121 to determine duration of events is generally non-invasive in that the user experience analysis system 100 does not need to interact with an application running on the desktop 121 that generates an event to determine the duration of the event. This allows the user experience analysis system 100 to determine durations of events across many different applications and platforms.

Parameters may be entered for capturing video of the desktop. The parameters may include number of frames per second, which for example indicates a constant frame rate of the video. The number of images captured may be equal to the parameter for the number of frames per second. For example, the parameter for the number of frames per second indicates x number of frames per second. Accordingly, x number of images of the desktop are captured per second and converted to frames for the video. For example, x may be equal 5, 10, 20, 100, etc. The frames are stored in the data storage 103. To minimize the amount of data stored, differences between frames may be stored rather than entire frames. The parameter of number of frames per second and other parameters described herein may be set by a user.

A parameter may include number of monitors for the desktop 121. The desktop 121 may be displayed on multiple monitors. The event capture subsystem 101 captures video of the desktop over multiple monitors if the desktop 121 is spread throughout the multiple monitors.

In one embodiment, a desktop event generation script 140 is provided to the event capture subsystem 101 and may be executed on the target computer 120 to execute events on the desktop 121. The desktop event generation script 140 includes commands to execute different user inputs. Examples of the commands may include move pointer icon and select the icon. In another example, the commands initiate selection of a drop down menu. The desktop event generation script 140 executes the user inputs in the order specified by the commands. Different user inputs may be provided in the desktop event generation script 140 depending on the response times of actions in the desktop 121 that are desired to be tested.

The event capture subsystem 101 may capture and store video of the desktop 121 before and after an infrastructure change. For example, the desktop event generation script 140 is executed on the desktop 121 to capture video of events on the desktop 121 before the infrastructure change. The video captured before the infrastructure change is referred to as the "before" video and is stored in the data storage 103. The desktop event generation script 140 and the "before" video captured based on the desktop event generation script 140 may be used to establish a performance baseline for comparison purposes. After an infrastructure change, the desktop event generation script 140 is executed on the desktop 121 to capture video of the same events on the desktop 121 after the infrastructure change. This video is referred to as the "after" video and is stored in the data storage 103. The same events are executed on the desktop 121 before and after the infrastructure change. For example, an event may include a user input comprising clicking on a start menu in the desktop 121.

This same event is performed in the desktop 121 before and after the infrastructure change.

The duration analysis subsystem 102 analyzes video of the desktop 121. The analysis may include determining a duration of events in the video of the desktop 121. Duration of the same events occurring in the "before" and "after" videos may be determined and compared to determine an pact on us experience in response to the infrastructure change. The duration analysis subsystem 102 may include a video marking module 115 to mark user inputs in video of the desktop 121. The user interface 104 may include controls for marking a pointer in the video if a user input is detected. In one embodiment, a user watching the video of the desktop 121 through the user interface 104 identifies a user input in the video, and clicks a control button to add a visual cue to the pointer in the video. For example, if the pointer is showing selection of a button on the desktop 121, the pointer may be converted to a star or another shape in the frame where the user input is shown. The addition of visual cues can be performed prior to determining duration of events in the video. The visual cues may provide an easy-to-identify indication of the beginning of an event during subsequent playback of the video for determining durations of the events.

The duration analysis subsystem 102 may include a video playback module 116 to generate controls for moving through frames of the video. The controls may be displayed in the user interface 104 and include controls to stop, play, fast forward, rewind, jump to the beginning of the video, jump to the end of the video, a video counter window that can receive a counter value entered by a user to jump to a frame at the counter value, pixel watch controls to fast forward to a frame where a pixel changes, controls to start event time and to end event time, and windows to show event duration. The controls may comprise buttons that can be selected by user, or windows where a user can enter a value. Examples of the controls are described below with respect to the screenshots of the user interface 104.

The duration analysis subsystem 102 may include a pixel watch module 117 that detects a change in one or more pre-selected pixels and pauses the video and/or provides an indication of a change in a pixel of the one or more pre-selected pixels. For example, if a user is watching video of the desktop 121, and activates the pixel watch, a pixel or region of pixels is selected in a current frame. The video is fast-forwarded to a subsequent frame in the video (e.g., a next future frame) where a change in the pixel is detected. The change in the pixel may be a change in the color of the pixel. A change pixel may be determined by measuring a pixel value in the current frame and measuring the pixel value in subsequent frames until a change in the pixel value is detected. The pixel value may include a red, green, blue (RGB) value, an intensity value, a grayscale value and/or other pixel values. A counter value may be recorded at the beginning of the event and at the end of the event, and the counter values may be stored with information for the event, for example, in an event table. In one example, a counter value for each frame represents the time elapsed from the beginning of the video to the frame.

The duration analysis subsystem 102 may include an event duration determination module 118 that determines and stores the duration of events. The event duration determination module 118 may store a list of events in the event table, and store the duration of each event as determined for the "before" video and the "after" video. Event duration may be calculated from a difference in a counter times for the event.

The event duration determination module 118 may include a comparison and notification module 119 that compares the durations from the "before" video and the "after" video for each event, and may generate a notification if the difference of the durations is greater than a threshold.

The subsystems and modules of the user experience analysis system 100 may comprise machine readable instructions stared on a non-transitory computer readable medium. In addition, or alternatively, the modules and other elements of the system 100 may comprise hardware or a combination of machine readable instructions and hardware.

Figure 2:
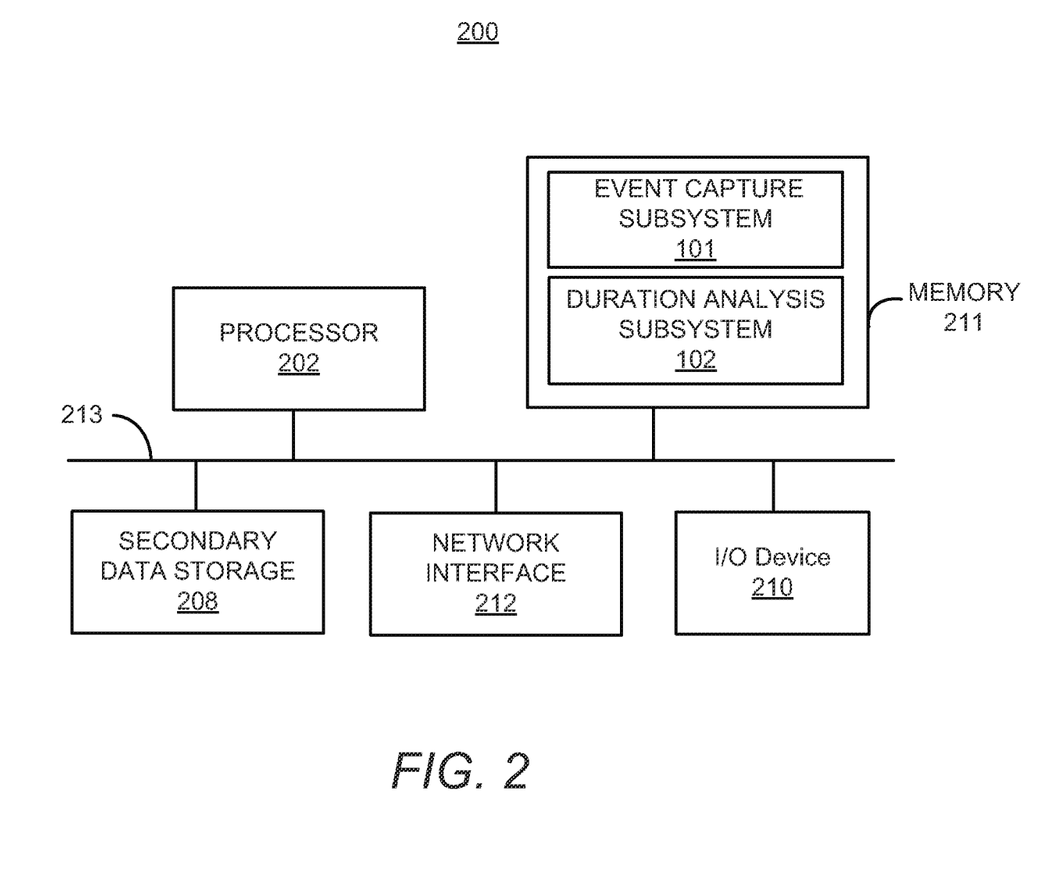
FIG. 2 illustrates a computer system that may be used as a platform for the user experience analysis system, according to an embodiment.

FIG. 2 illustrates a computer system 200 that may be used as a platform for the system 100. The computer system 200 represents a generic platform that includes components that may be in a computer. The computer system 200 may execute, by one or more processors or other hardware processing circuits, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 200 includes a processor 202 that may implement or execute machine readable instructions performing some or all of the methods, functions and other processes described herein. Commands and data from the processor 202 are communicated over a communication bus 213. The processor 202 may include a CPU, an application-specific integrated circuit (ASIC) or other processing circuit. The computer system 200 also includes a main memory 211, such as a random access memory (RAM), where the machine readable instructions and data for the processor 202 may reside during runtime, and a secondary data storage 208, which may be non-volatile and stores machine readable instructions and data for the system 100. For example, machine readable instructions for the user experience analysis system 100 may reside in the memory 211 during runtime and may be stored in the secondary data storage 208. The memory 211 and secondary data storage 208 are examples of non-transitory computer readable mediums.

The computer system 200 may include an I/O device 210, such as a keyboard, a mouse, a display, etc. For example, the I/O device 210 includes a display for the user interface 104 to display reports, notifications or other information. The computer system 200 may include a network interface 212 for connecting to a network, such as the Internet. Other known computer components may be added or substituted in the computer system 200. The user experience analysis system 100 may be executed on a single computer system or on multiple computer systems as further described with respect to FIG. 3. For example, the event capture subsystem 101 of the user experience analysis system 100 may be executed on the target computer 120, and the duration analysis subsystem 102 of the user experience analysis system 100 may be executed on a different computer system.

Figure 3:
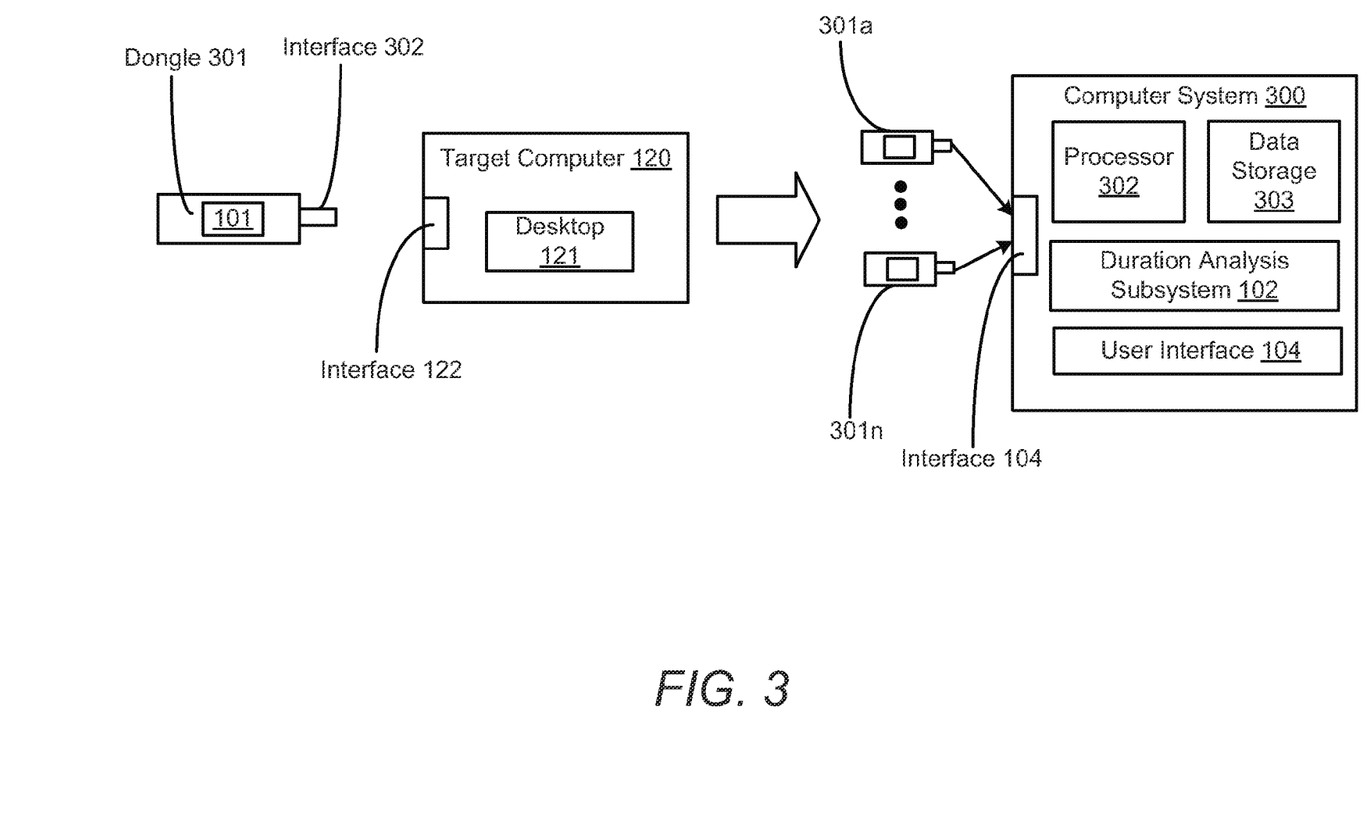
FIG. 3 illustrates an embodiment of the user experience analysis system operating on multiple devices.

FIG. 3 illustrates an embodiment whereby the event capture subsystem 101 is stored on a dongle 301 connected to the target computer 120 via an interface. The dongle 301 comprises a hardware device separate from the target computer 120 but connectable to the target computer 120 and/or other computers via an interface 302. The dongle 301 includes data storage, which may be non-volatile data storage. In one example, the dongle 301 is a universal serial bus (USB) stick including a memory chip storing the event capture subsystem 101 which may comprise software and may store video captured by the video capture subsystem 101. The USB stick comprises a USB interface including a USB connector to connect to a USB interface in the target computer 120. The dongle 301 may comprise other types of interfaces, such as a wireless interface. The dongle 301 may comprise processing circuitry to execute functions or commands. The dongle 301, when connected to the target computer 120 via its interface 302 and the interface 122, launches the event capture subsystem 101 on the operating system 302 of the target computer 120. The event capture subsystem 101 captures video of the desktop 121 and stores the video in the dongle 301. The video stored in the dongle 301 may be encrypted by the event capture subsystem 101.

Computer system 300 executes the duration analysis subsystem 102 and the user interface 104. The computer system 300 is separate from the dongle 301 and the target computer 120. The computer system 300 may be a personal computer or a server or any type of computer with sufficient data storage and processing hardware to execute the duration analysis subsystem 102 and user interface 104. The computer system may include a processor 302 to execute the duration analysis subsystem 102 and user interface 104 and may include a data storage 303 to store machine readable instructions, videos and event tables. The computer system 300 may include an interface 304 to connect to the dongles 301a-n. In an example, different dongles 301a-n may be used to capture "before" and "after" videos from desktops of different target computers. Each of the dongles 301a-n may be connected to the computer system 300 and video from the dongles 301a-n may be loaded from the dongles 301a-n to the computer system 300. The duration analysis subsystem 102 executed by the computer system 300 may generate and store an event table for each target computer and determine and compare events in "before" and "after" videos of the desktops for each target computer.

Figure 4:
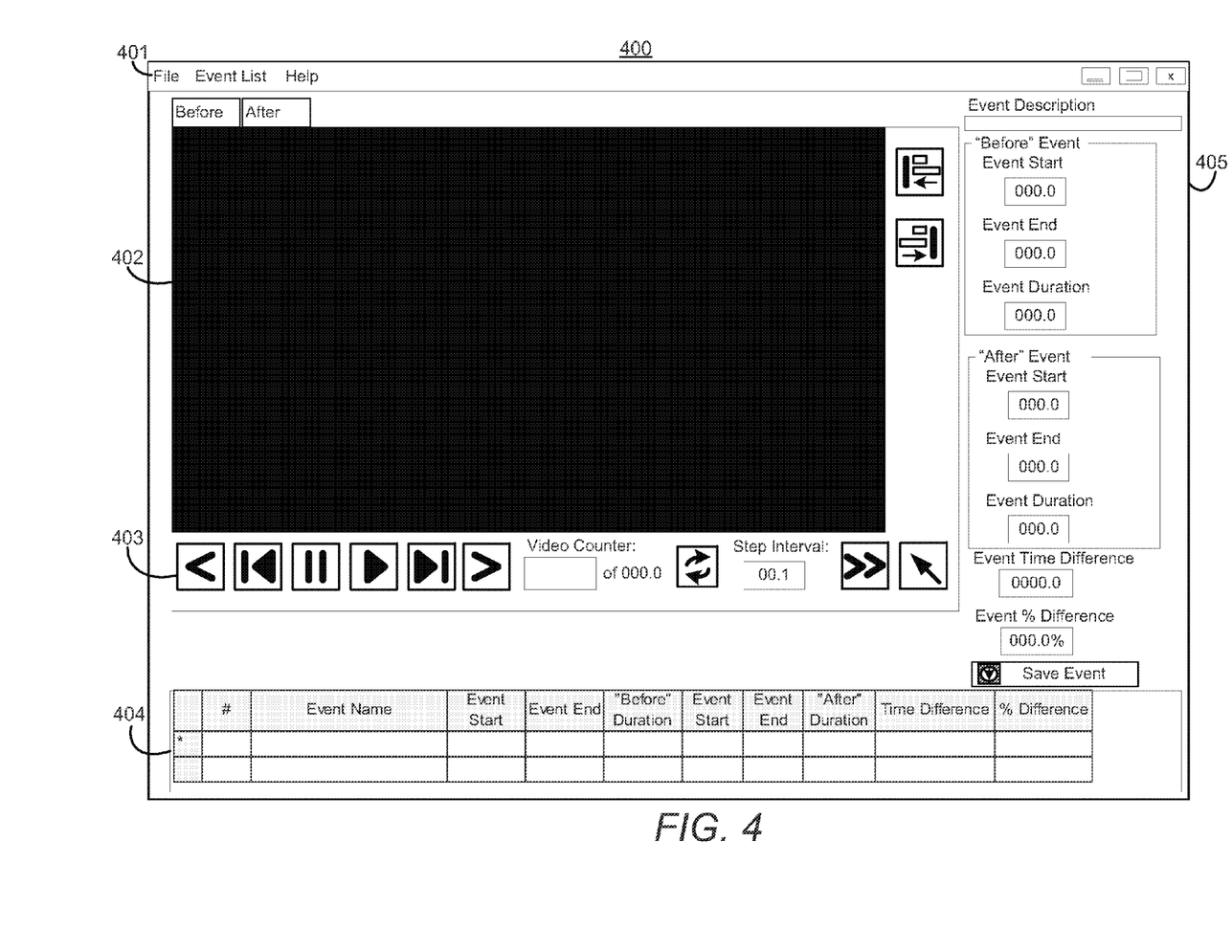

FIG. 4 shows an example of a screen 400 generated in the user interface 104 for the user experience analysis system 100 shorn in FIG. 1. The user interface 104 may include drop down menus 401 that allow opening and closing of video files of a desktop and importing and exporting of event lists for an event table in a standardized format consumable by other applications, such as a spreadsheet application.

A tab or split-screen view in the video viewing area 402 may be provided to allow viewing of "before" and "after" videos of a desktop. Controls 403 may include buttons to control the playback of the videos and other functions. An event list area 404 shows a list of events and calculated durations. A work area 405 shows calculated results for the videos being analyzed.

Figure 5:
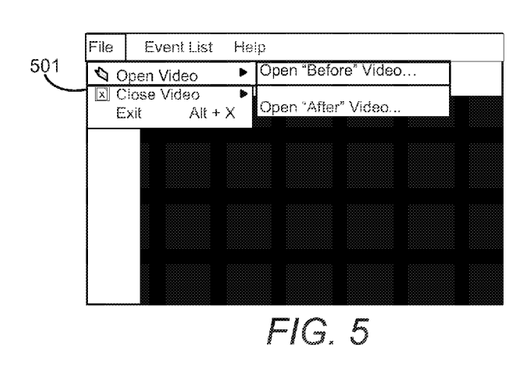

FIG. 5 shows an example of a portion 500 of a screen of the user interface 104 to load video for analysis by the duration analysis subsystem 102. FIG. 5 shows drop-down menus 501 to select the "Open Video" function. The user is prompted to open the "Before" video and/or the "After" video. Depending on which video is selected, the video is loaded and shown in the video viewing area 402. Both videos may be loaded and viewed in the viewing area 402 in split screens or via tabbed screens.

Figure 6:
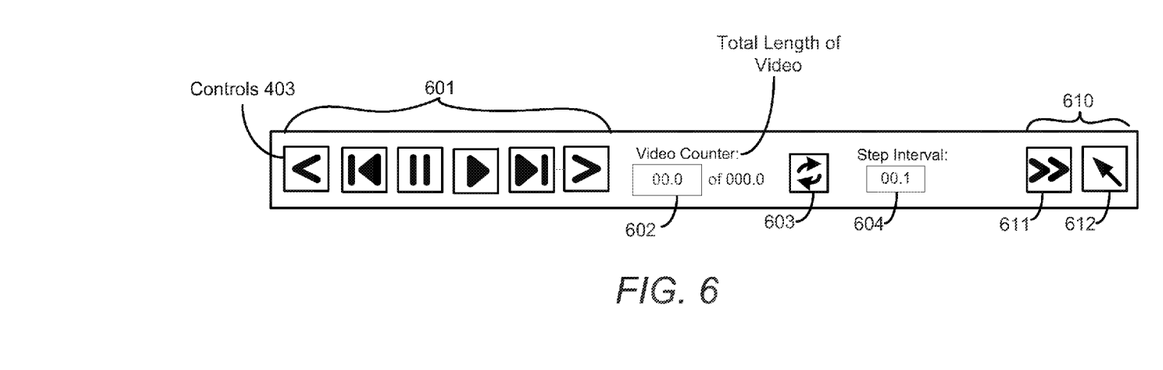

FIG. 6 shows details of the controls 403 from FIG. 4. The controls 403 may be used to find the beginning and/or the end of an event in the video. The controls 403 include buttons 601 to pause, play, rewind or fast forward (e.g., by frame), and buttons to jump to the beginning or the end of the video. A counter 602 shows a current timestamp of the video. Also, a total length of the video is shown. The counter may be manually edited in the window, and a refresh button 603 may be used to jump to that point in the video. A step interval window 604 shows the interval for the step forwards and the step backwards button. In the step interval window 604, 00.1 means 1 frame if the number of frames per second is 10.

FIG. 6 also shows pixel watch buttons 610 for the pixel watch function provided by the duration analysis subsystem 102. The pixel watch buttons 610 include a fast forward button 611 and a set watch area button 612. For example, a user selects a pixel or a group of pixels in an area in a frame displayed in the video viewing area 402, and cocks the set watch area button 612. In an example, the user selects a single pixel, and the duration analysis subsystem 102 stores one or more pixel values for the selected pixel in response to the user clicking the set watch area button 612. The pixel values may include RGB values, an intensity value, a grayscale value and/or other pixel values. The user may then click the fast forward button 611 and the video is fast forwarded to a future frame where the pixel value changes. The future frame for example is the next frame in the video where the pixel changes. In an example, the user goes to a frame that is the beginning of an event. This may be a frame where a pointer in the video clicks on a button to display a menu. The user may select a pixel in the frame where the menu is to be displayed and clicks the set watch area button 612. The user may also click a start event timer button to indicate the start of an event and the video playback counter value is stored for the event. The user then clicks on the fast forward button 611 and the video fast forwards to the next frame where the pixel changes. If this frame shows the menu fully displayed, then it is the end of the event. The user may click a button to stop the event time, and the counter values for the beginning and the end of the event are stored to determine the duration of the event. If the menu is only partially displayed, the user may click the fast forward button 611 or use other buttons to step through one or more future frames to identify the end of the event and store the end of event counter value.

Figure 7:
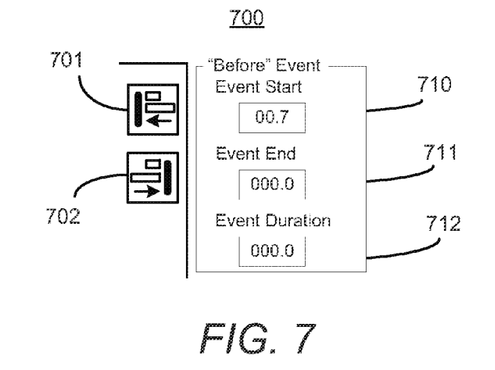

FIG. 7 shows buttons 700 in the user interface 104 to capture an event beginning time stamp and ending time stamp. For example, once the video is paused at the beginning of the event, the user presses record event start time button 701 and the current video counter value is stored for the event and shown in the event start window 710. The record event start time button 701 and the event start window 710 may be aligned horizontally. A visual cue may be provided in the video to help identify the frame having the beginning of the event.

Once the video paused at the frame having the end of the event, the user presses record event end time button 702 and the current video counter value is stored for the event as the end time stamp and is shown in the event end window 711. The record event end time button 702 and the event end window 711 may be aligned horizontally. The event duration is calculated. For example, end event−start event=event duration. The event duration is shown in the event duration window 712.

Start and end time stamps are stored for "before" and "after" videos for the same event. The duration analysis subsystem 102 calculates durations for the event in the "before and "after"" videos and the duration time differences and the event percentage difference values.

Figure 8A:
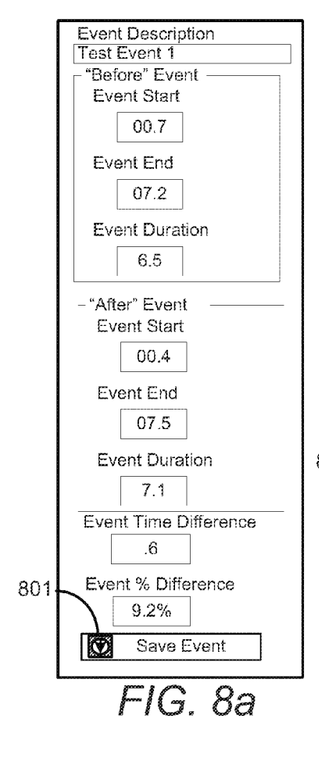
Figure 8B:
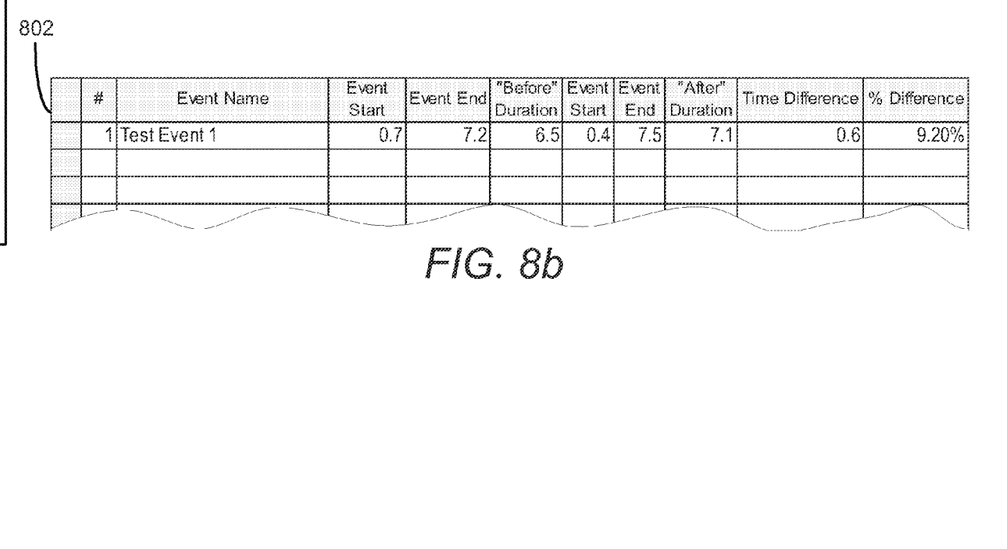

FIGS. 8A-B show storing an event and its durations and time differences. For example, the "Save Event" button 801 shown in FIG. 8A may be clicked to store the values for the event. FIG. 8B shows an entry 802 in the event table for the saved event. An event description can be entered for the entry 802 and values in the entry 802 may be manually adjusted.

Event lists for event tables may be exported. For example, an event list may be created in a delimited text file, which can be imported to another application. Also, event lists may be loaded into the system 100 and shown in an event table via the user interface 104.

Figure 9:
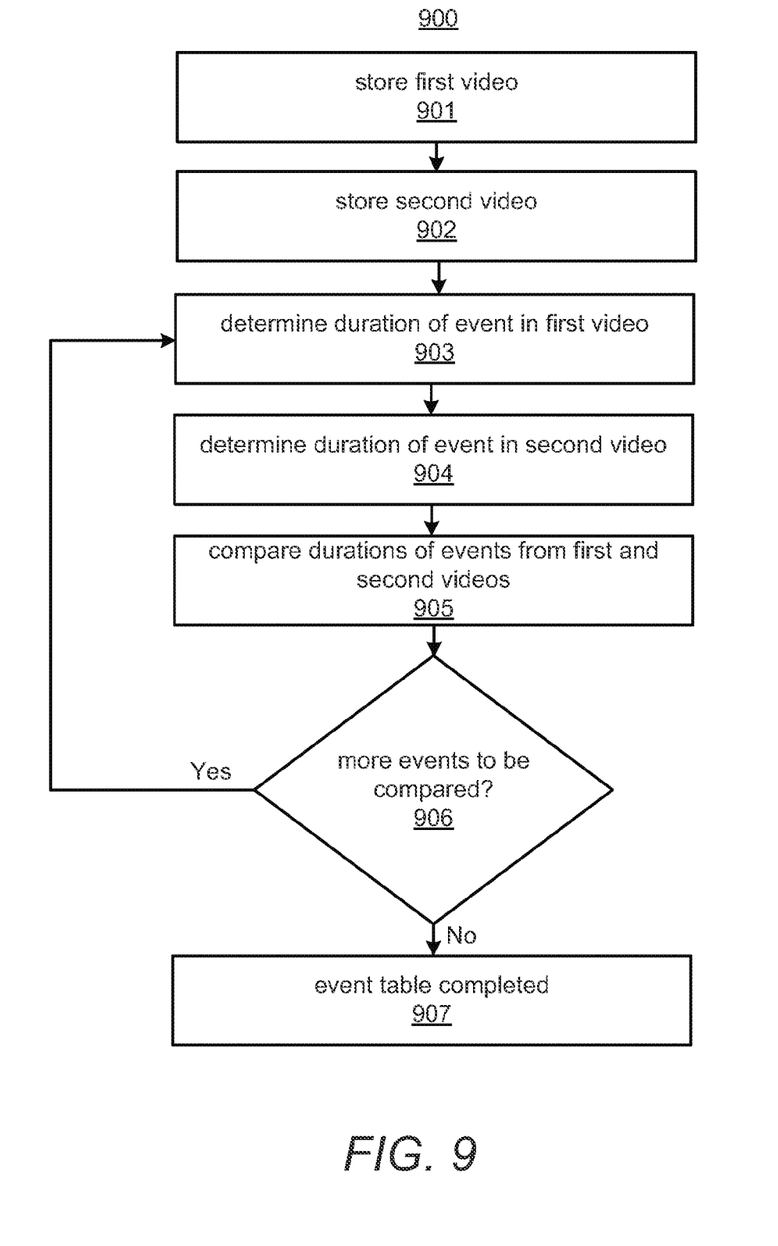
FIGS. 9-11 illustrate methods, according to embodiments.
Figure 10:
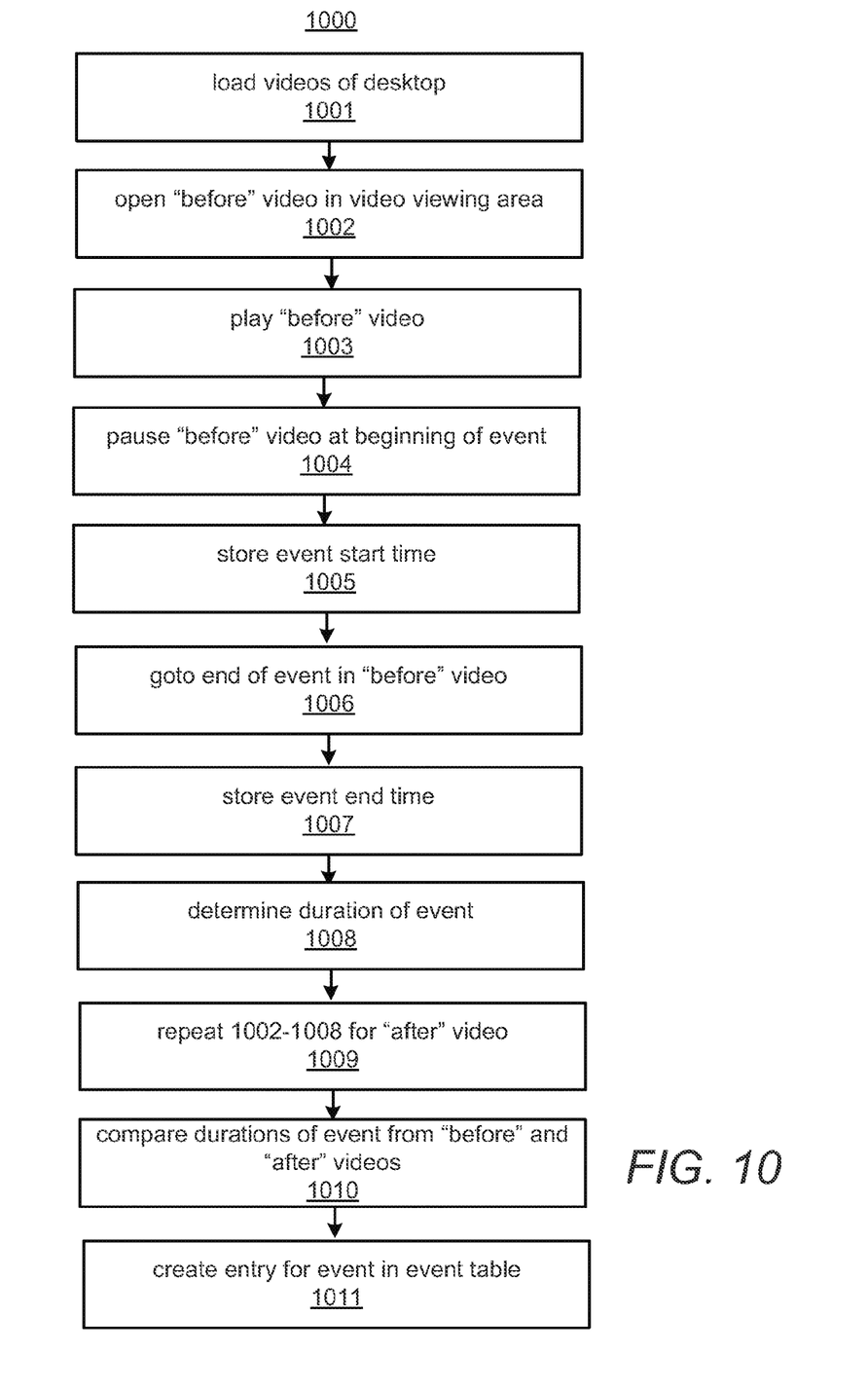
Figure 11:
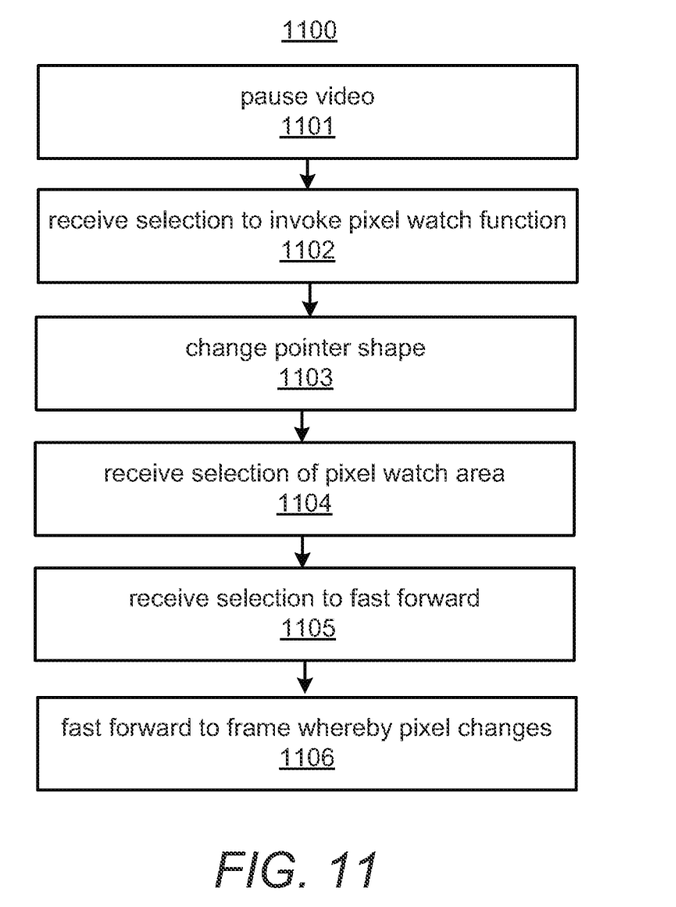

FIGS. 9-11 illustrate methods according to embodiments. The methods are described with respect to the user experience analysis system 100 shown in FIGS. 1-3 by way of example. The methods may be performed in other systems.

FIG. 9 shows a method 900. At 901, the event capture subsystem 101 captures and stores a first video of a desktop. For example, the first video is a "before" video of the desktop 121 prior to an infrastructure change. The first video, for example, includes events occurring in the desktop 121. The events may be executed by the script 140.

At 902, the event capture subsystem 101 captures and stores a second video of the desktop. For example, the second video is an "after" video of the desktop 121 after an infrastructure change. The second video, for example, includes the same events occurring in the first video. The events may be executed by the script 140. The first and second video may be stored in the data storage 103.

At 903 the duration analysis subsystem 102 determines duration of an execution of an event in the first video, and at 904, the duration analysis subsystem 102 determines a duration of the same event in the second video. The same event in the "before" and "after" videos may start at different times in the videos, but the durations can be determined and assigned to the event. For example, an event 1 may occur one minute from the start of the "before" video but event 1 may occur two minutes from the start of the "after" video. The durations of event 1 as determined from the "before" and "after" videos are determined and are associated with event 1 for example in an event table. Accordingly, durations of events may be determined without worrying about actions on the desktop that may impact the start of an event.

At 905, the duration analysis subsystem 102 compares the durations of the event in the first video and the second video to determine a measure of a change in the user experience. The measure may include a percentage difference in the durations or an actual difference in the durations. For example, the actual difference or percentage difference may be compared to a threshold. If the threshold is exceeded, an indication may be stored for the event to indicate that it is indicative or potentially indicative in a negative change in user experience. By way of example, if the difference in durations for the same event (e.g., "before" event duration-"after" event duration) is greater than 0, the user experience may be considered positive for the event. For example, if the "after" event duration is less than the "before" event duration, the user experience may be considered positive. If the difference is 0, the user experience may be considered unchanged. If the difference is less than 0, the user experience may be considered negative for the event. For example, if the "after" event duration is greater than the "before" event duration, the user experience may be considered negative. In another example, if the "after" event duration is greater than the "before" event duration by a predetermined amount, such as by 0.5 seconds or by 1 second or by 2 seconds, then the user experience may be considered negative; if the "after" event duration is less than the "before" event duration by a predetermined amount, then the user experience may be considered positive; otherwise the user experience may be considered unchanged. An indication of the user experience for the event may be provided in the event table. The event table may include entries for each event in the "before" and "after" videos. Each event in the event table may include an indication of positive, negative or unchanged. Each event may be color-coded, e.g., green, yellow, red, to provide an indication of positive, unchanged, or negative.

At 906, a determination is made as to whether any more events in the first and second videos need to be compared. If yes, 903-905 are repeated. Otherwise, at 907, the event table is completed. The event table may be saved and may be exported to another application, such as a spreadsheet application.

FIG. 10 illustrates a method 1000 for analyzing events in videos of a desktop, according to an embodiment. Some of the steps are the same or similar to the steps of the method 900 but may provide more detail of steps of the method 900.

At 1001, videos of the desktop 121 are loaded. For example, "before" and "after" videos including the same set of events are loaded into a computer hosting the duration analysis subsystem 102.

At 1002, the loaded "before" video is ready for viewing in the video viewing area 402 of the user interface 104 starting from the first frame. For example, a user may rewind the video to its first frame.

At 1003, the duration analysis subsystem 102 plays the video in response to receiving an activation of play button in the user interface 104.

At 1004, the duration analysis subsystem 102 pauses the video at a frame having a user input of an event. The frame may be identified by a visual cue in the frame identifying the user input. In one example, the user pauses the video at that frame.

At 1005, the duration analysis subsystem 102 stores an event start time for the event for example based on the gaunter value for the frame showing the start of the event.

At 1006, the duration analysis subsystem 102 moves to a frame showing the end of the event, which may be a response to user input displayed in the desktop 121. Pixel watch buttons may be used to fast forward to the frame showing the end of the event or a fast forward button or other controls may be used to find the frame showing the end of the event.

At 1007, the duration analysis subsystem 102 stores an event end time for the event for example for example based on the counter value for the frame showing the end of the event. The counter values for 1005 and 1007 may represent the elapsed time from the start of the video to the respective frame.

At 1008, the duration analysis subsystem 102 determines the duration of the event in the "before" video from the start and end times.

At 1009, 1002-1008 may be repeated for the same event in the "after" video. Event start and end times are determined, and duration for the event in the "after" video is determined. At 1010, the durations for the event in the "before" video and in the "after" video are compared. At 1011, an entry is created in an event table that may include an event identifier for the event. The entry may include event start and end times, and duration of the event as determined from the "before" video, and the entry may include event start and end times, and duration of the event as determined from the "after" video. The entry may also include results of the comparison of the durations for the event. The comparison may include determining a difference in the durations and the difference may be provided in the entry. The method 1000 may be repeated for a set of events, wherein each event is captured in both the "before" video and the "after" video. Also, entries in the event table may be populated for each event. The entries may be viewed to determine whether the differences in durations for each event indicate a positive, negative or no change in user experience. If multiple events have durations indicative of a negative user experience, then further changes may be done to the infrastructure to improve performance of the applications and systems.

FIG. 11 illustrates a method 1100 for fast forwarding through video using the pixel watch function. A screenshot for pixel watch controls is shown in FIG. 6. In one example, the pixel watch function is used to fast forward to a frame showing the end of an event to determine a duration of the event. The pixel watch function may be executed by the duration analysis subsystem 102.

At 1101, a video is paused. The video may be a "before" or "after" video loaded into the system 100 and shown in the video viewing area 402 shown in FIG. 4. The video may be paused by the pause button shown in buttons 601 in FIG. 6.

At 1102, a selection to invoke the pixel watch function is received. For example, the user clicks on the set watch area button 612 shown in FIG. 6.

At 1103, the shape of the pointer in the video viewing area 402 is changed, for example, to a crosshair pointer, in response to the selection of the pixel watch function. This helps indicate to the user that the pixel watch area is ready to be selected.

At 1104, selection of a pixel watch area is received in the currently displayed frame of the video. For example, the user moves the cross hair pointer to a pixel in the current frame and clicks the mouse. If an area with multiple pixels is to be selected, the user clicks and drags the mouse to create a window encompassing the pixel area to select the pixel area. The duration analysis subsystem 102 for example stores one or more pixel values for the selected pixel or pixels in response to the user clicking the set watch area button 612. After the pixel watch area is selected, the pointer returns to its original shape, such as an arrow pointer.

At 1105, selection of a fast forward to be performed is received. For example, after the pixel watch area is selected, the user clicks on the fast forward button 611 shown in FIG. 6.

At 1106, the video is fast forwarded from the current frame to the next frame in the video whereby a pixel in the pixel watch area changes. The duration analysis subsystem 102 may determine if the pixel value for a pixel in the pixel watch area changes to determine of the pixel changes in the future frame. If desired, the user may click on the fast forward button 611 multiple times to fast forward multiple times to future frames whereby the pixel value changes from its original value which may be determined at 1104.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A user experience analysis system to analyze events in a computer desktop, the user experience analysis system comprising:
    data storage;
    an event capture subsystem, executed by a processor, to capture a first video of a desktop of a target computer prior to an infrastructure change and to capture a second video of the desktop after the infrastructure change and store the first video and the second video in the data storage;
    a duration analysis subsystem to determine a first duration of an execution of an event in the desktop from the first video and determine a second duration of an execution of the event in the desktop from the second video, and to compare the first duration and the second duration to measure a change in user experience, wherein the event in the desktop includes a user input and a response to the user input, wherein the duration analysis subsystem comprises a pixel watch module to determine a selection of a pixel in a current frame of a video, wherein the video is the first video or the second video, and to identify a next future frame in the video whereby the pixel changes; and
    a user interface including a video viewing area to view the video and including pixel watch buttons comprising a fast forward button and a set watch area button, wherein the set watch area button is selected for the determination of the selection of the pixel in the current frame, and the fast forward button is selected to display the next future frame in the video whereby the pixel changes.

2. The user experience analysis system of claim 1, wherein the pixel watch module determines a pixel value of the selected pixel in the current frame and determines whether the pixel value for the selected pixel changes in a future frame of the video to identify the next future frame in the video.

3. The user experience analysis system of claim 2, wherein the pixel value comprises at least one of an intensity, an red, green, blue (RGB) value and a grayscale value.

4. The user experience analysis system of claim 1, comprising:
    a video marking module to mark user inputs for events in at least one of the first video and the second video with a visual cue.

5. The user experience analysis system of claim 4, wherein the visual cue comprises a change in shape of a pointer in the desktop.

6. The user experience analysis system of claim 1, comprising:
    a user interface including a video viewing area to view a video comprising at least one of the first video and the second video, controls to fast forward, rewind, pause, play and move to a specific frame in the video displayed in the video viewing area, controls to capture an event start time and an event end time, and a window showing a duration of an event in at least one of the first video and the second video.

7. The user experience analysis system of claim 1, wherein the data storage stores an event table identifying events, wherein each event occurred in both the first video and the second video, and for each event, the event table includes the duration of the event in the first video and the duration of the event in the second video and a value indicating a difference in the durations.

8. The user experience analysis system of claim 7, wherein the event table is viewable through a user interface and an entry for an event in the event table is editable through the user interface.

9. The user experience analysis system of claim 1, comprising:
    a dongle including data storage to store the event capture subsystem and to store the first video and the second video and including an interface to connect to the target computer, wherein the event capture subsystem is launched from the dongle in an operating system in the target computer to execute the event capture subsystem to capture the first video and the second video.

10. The user experience analysis system of claim 9, comprising:
    a computer system to execute the duration analysis subsystem, wherein the computer system is separate from the dongle and the target computer.

11. The user experience analysis system of claim 10, wherein the computer system comprises an interface to connect to a plurality of dongles, and a data storage to store videos loaded from the dongles, wherein the videos include videos of desktops from a plurality of target computers, and the duration analysis subsystem determines durations of events in the videos and stores the durations in event tables for the target computers.

12. A method of measuring user experience associated with a computer desktop comprising:
- storing a first video of a desktop that is captured prior to an infrastructure change in a storage device;
- storing a second video of the desktop that is captured after the infrastructure change in the storage device;
- determining a first duration of an event occurring in the desktop from the first video, wherein the event occurring in the desktop includes a user input and a response to the user input;
- determining a second duration of the event occurring in the desktop from the second video;
- comparing, by a processor, the first duration and the second duration to measure a change in the user experience;
- displaying a video in a video viewing area of a user interface, wherein the video is the first video or the second video;
- receiving a selection of a pixel in a current frame of the video displayed in the video viewing area;
- fast forwarding the video displayed in the video viewing area to a future frame in the video whereby the pixel changes;
- storing a pixel value for the selected pixel in the current frame, wherein the pixel value is a measurement of at least one color and intensity of the pixel; and
- identifying the future frame where the pixel value for the pixel changes.

13. The method of claim 12, comprising:
- storing a start event counter value for a start of an event prior to the fast forwarding;
- storing an end event counter value for an end of the event, wherein the end counter value is determined for the future frame; and
- determining a duration of the event from the start event counter value and the end event counter value.

14. The method of claim 12, comprising:
- storing a pixel value for the selected pixel in the current frame, wherein the pixel value is a measurement of at least one color and intensity of the pixel; and
- identifying the future frame where the pixel value for the pixel changes.

15. The method of claim 12, comprising:
- marking user inputs in the first video or second video with visual cues.

16. A non-transitory computer readable medium storing machine readable instructions, wherein the machine readable instructions are executable by a processor to:
- load a first video of a desktop into a computer system, wherein the first video includes a plurality of events occurring in the desktop prior to an infrastructure change that is to impact execution of the plurality of events, and wherein each of the plurality of events occurring in the desktop includes a user input and a response to the user input;
- determine durations of the plurality of events in the first desktop from the first video;
- load a second video of the desktop into the computer system, wherein the second video includes the plurality of events occurring in the desktop after the infrastructure change;
- determine a first set of durations of the plurality of events from the first video;
- determine a second set of durations of the plurality of events from the second video; compare the first and second sets of durations to measure a change in the user experience;
- display a video in a video viewing area of a user interface;
- receive a selection of a single pixel in a current frame of the video displayed in the video viewing area; and
- fast forward the video displayed in the video viewing area to a future frame in the video whereby the pixel changes.

* * * * *